United States Patent
Harwich

[19]

[11] Patent Number: 6,067,934
[45] Date of Patent: May 30, 2000

[54] CONVERTIBLE BUTTERFLY AND BIRD FEEDER

[76] Inventor: Mary Belle T. Harwich, P.O. Box 533, Glencoe, Ill. 60022

[21] Appl. No.: 09/173,100

[22] Filed: Oct. 15, 1998

[51] Int. Cl.[7] ........................... A01K 29/00; A01K 39/01
[52] U.S. Cl. ........................................ 119/57.8; 119/51.03
[58] Field of Search ............................... 119/51.03, 57.8, 119/57.9

[56] References Cited

U.S. PATENT DOCUMENTS

| | | |
|---|---|---|
| D. 214,735 | 7/1969 | Cooper . |
| D. 330,953 | 11/1992 | Schneider ................................ D30/124 |
| D. 368,557 | 4/1996 | McGinty ................................ D30/124 |
| 1,369,079 | 2/1921 | Boothe ................................. 119/51.03 |
| 1,596,333 | 8/1926 | Boyle .................................. 119/51.03 |
| 1,751,388 | 3/1930 | Bircher ................................ 119/51.03 |
| 3,537,429 | 11/1970 | Regan . |
| 3,638,617 | 2/1972 | White ................................. 119/53.5 X |
| 4,434,745 | 3/1984 | Perkins et al. ........................ 119/57.9 |
| 4,602,757 | 7/1986 | Signorelli ............................. 248/231.1 |
| 5,016,573 | 5/1991 | Power ................................ 119/57.8 X |
| 5,033,708 | 7/1991 | Brue et al. ........................... 119/57.8 X |
| 5,269,258 | 12/1993 | Brown ................................. 119/57.9 |
| 5,323,734 | 6/1994 | Meadows ............................. 119/51.01 |
| 5,323,995 | 6/1994 | Grittman et al. ................... 119/57.8 X |
| 5,377,617 | 1/1995 | Harwich ............................. 119/57.8 X |
| 5,479,878 | 1/1996 | Coulter ................................ 119/51.03 |
| 5,568,789 | 10/1996 | Koenig et al. ......................... 119/57.9 |
| 5,701,842 | 12/1997 | Whittles ............................. 119/57.8 X |
| 5,806,458 | 9/1998 | Harwich ................................ 119/51.03 |

Primary Examiner—Robert P. Swiatek
Attorney, Agent, or Firm—Cook, Alex, McFarron, Manzo, Cummings & Mehler

[57] ABSTRACT

A feeder for butterflies, moths and birds. The feeder includes a top which can form a crawling insect guard for the feeder, and the feeder may be hung by a hanging ring. The feeder also includes a grid defining a first set of openings and a second set of openings. The first set of openings prevents access to food within the feeder by birds. The second set of openings allows such access. The feeder further includes a butterfly feeder core piece which may be positioned within the grid. The core piece has a base and a skewer upon which the food is threaded. The base has a rim that substantially covers the second set of openings when the core piece is positioned within the grid to prevent access to the food by birds. When the core piece is not used, birds may access food within the feeder. As such, the feeder is readily convertible between two configurations—one where birds may feed, another where they may not.

21 Claims, 4 Drawing Sheets

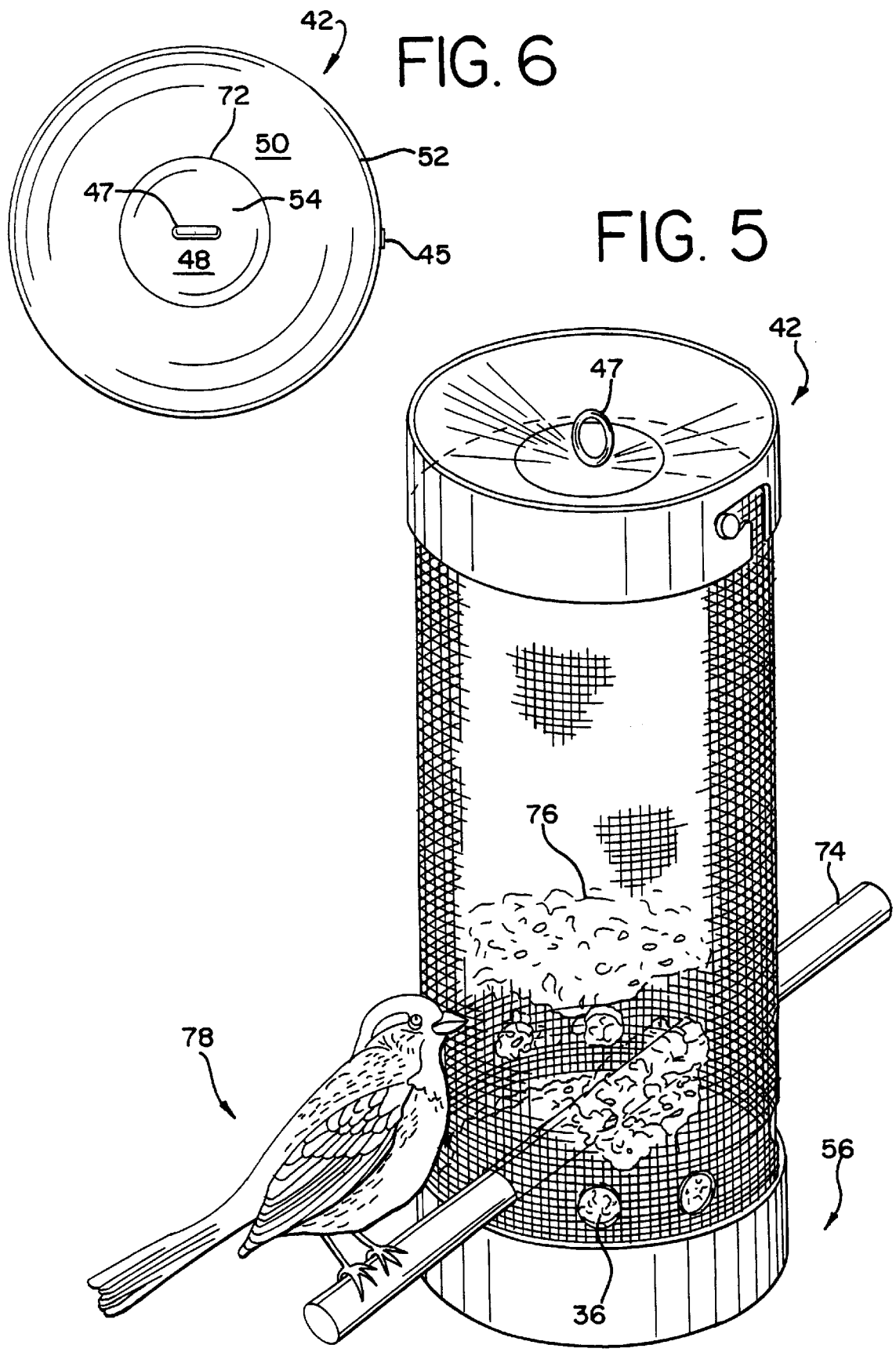

CONVERTIBLE BUTTERFLY AND BIRD FEEDER

BACKGROUND OF THE INVENTION

The present invention relates to a feeding apparatus for feeding birds, butterflies, moths and the like. More particularly, the present invention relates to a new and improved feeder for birds, butterflies, moths and the like which may be converted between a winter mode configuration, wherein the feeding apparatus permits bird feeding, and a summer mode configuration, wherein the feeding apparatus permits butterfly and moth feeding, but does not permit bird feeding. The feeder is preferably hung from a tree or the like and may include a unique crawling insect guard to prevent ants and other crawling insects from reaching the food source contained within the feeder.

As described in U.S. Pat. No. 5,377,617, issued to the present inventor, the disclosure of which is hereby incorporated herein by reference, adult butterflies and moths share common characteristic mouth parts. The chief structure of their mouth parts includes a tubular proboscis or tongue through which liquids can be sucked up into the insect's mouth. When not feeding, the butterfly or moth carries its proboscis in a coiled spiral held beneath the insect's head. When feeding, the proboscis can be extended quickly and thrust deep into the cup of a flower or other source of liquid food. These mouth parts are a characteristic of moths and butterflies as a group, allowing such insects to feed on the nectar deep within the individual cups of various flowers.

The feeding apparatus shown and described in U.S. Pat. No. 5,377,617 provides several advantages over other prior feeding apparatuses. In particular, the feeding apparatus disclosed therein permits feeding by butterflies and moths, yet prevents feeding by undesired insects and small animals. The described feeding apparatus was the first feeder for butterflies, moths and the like which capitalized on their anatomical characteristics (i.e., their unique proboscis) and on the manner in which butterflies normally feed in nature to deny small birds and animals access to the food source contained within the feeder.

Despite these benefits, the feeding apparatus disclosed in U.S. Pat. No. 5,377,617 shares a shortcoming with other prior feeding apparatuses. In particular, the prior feeders are either designed exclusively for butterfly feeding, on one hand, or for bird feeding as well, on the other. The prior butterfly feeders are designed to feed only butterflies, moths and the like whereas the prior bird feeders typically permit both birds and insects to eat the food source. Until the present invention, there has never been a feeder that is designed to permit feeding by butterflies and moths, exclusively, when in a first configuration and to permit feeding by birds as well when in a second configuration.

To overcome this shortcoming and others of the prior art, it is an object of the present invention to provide a feeding apparatus that may be converted between a first, summer mode configuration and a second, winter mode configuration. In its summer mode configuration, the feeder of the present invention permits feeding by butterflies, moths and the like while simultaneously preventing pests and large animals, such as birds, from reaching the food source in the feeder. In its winter mode configuration, the feeder of the present invention permits feeding by birds and the like. In both configurations, pest insects are prevented from reaching the food source in the feeder, provided the unique crawling insect guard is used.

It is a further object of the present invention to provide a feeder which is attractive, yet may be easily and cost effectively manufactured.

Other objects provided by the present invention will become apparent from the following detailed description of the preferred embodiments in conjunction with the drawings.

SUMMARY OF THE INVENTION

In accordance with these and other objects, the present invention provides a feeder having a top and a grid connected thereto. The grid defines a plurality of openings including a first set of openings and a second set of openings. The first set of openings are size large enough to permit the ingress and egress of a butterfly or moth proboscis, yet small enough to prevent the ingress and egress of a bird. The second set of openings are large enough to permit the ingress and egress of the mouth parts of a bird. The feeder further includes a butterfly feeder core piece that may positioned within the grid. The core piece has a base with a rim that substantially covers the second set of openings when the core piece is so positioned. The feeder has a bottom that is connected to the grid. In a preferred aspect of the present invention, the first set of openings are all less than about three millimeters in width and the second set of openings are all greater than about six millimeters in width.

The present invention also provides a feeder for butterflies, moths, birds and the like. The feeder includes a top having an upper surface which is ramped. As such, the upper surface extends upward as it extends radially outward from its central portion thereof to form a well defining a crawling insect guard for the feeder. The top further includes a hanging ring or the like mounted thereto. Additionally, the feeder includes a grid having first and second ends, whereby the top is connected to the grid at its first end. The grid defines a plurality of openings including a first set of openings and a second set of openings. The first set of openings has openings which are less than about three millimeters in width. The second set of openings has openings which are greater than about six millimeters in width. The feeder further includes a butterfly feeder core component or piece which may be positioned within the grid. The core piece includes a base and a skewer, the base having a rim that substantially covers the second set of openings when the core piece is positioned within the grid. The butterfly feeder core piece base further can include a line of demarcation signifying the preferred spacing between a food source and the grid when a food source is threaded onto the skewer and the core piece is positioned within the grid. The feeder also includes a bottom connected to the grid at its second end which can have a second hanging ring mounted thereto.

BRIEF DESCRIPTION OF THE DRAWINGS

FIG. 5 is a perspective view of the feeder of FIG. 1 showing the feeder in its winter mode configuration;

FIG. 6 is a top plan view of a top, as used with the feeder of FIG. 1, showing the crawling insect guard associated therewith;

DETAILED DESCRIPTION OF THE PREFERRED EMBODIMENTS

Figure 1:
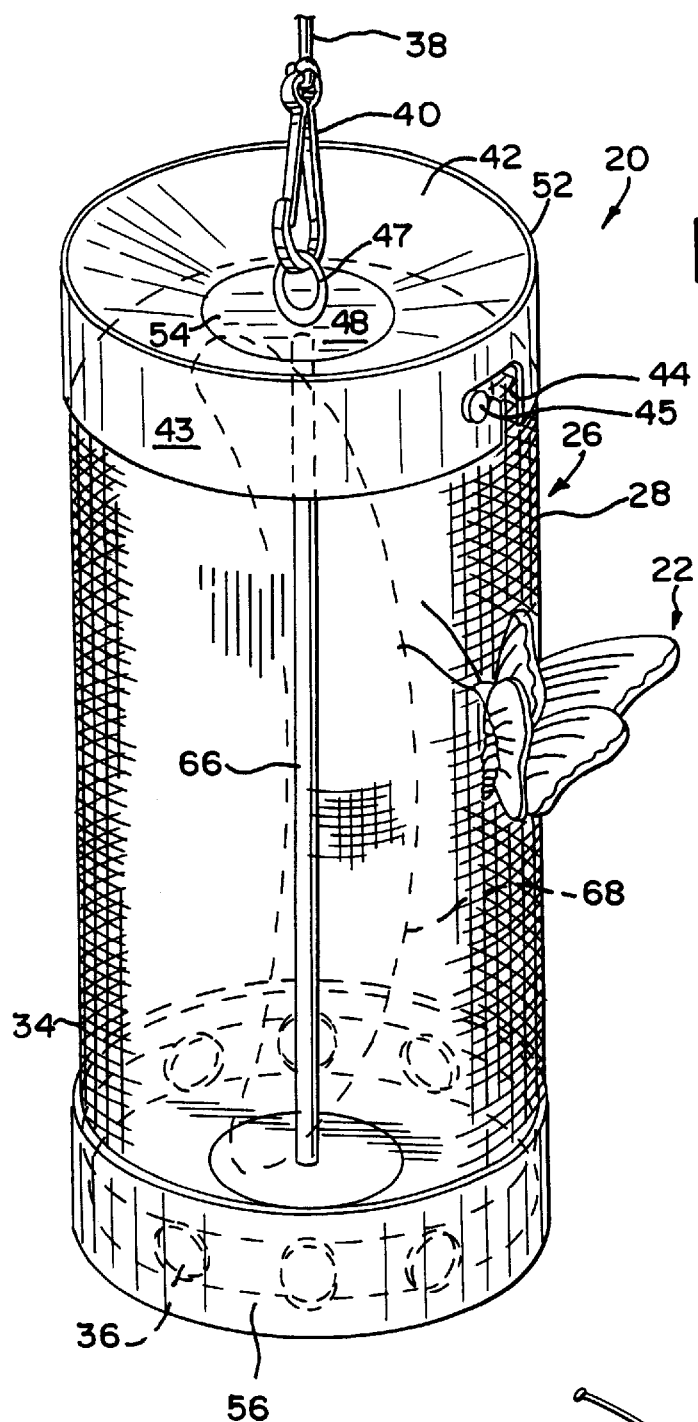
FIG. 1 is a perspective view of a feeder made in accordance with the principles of the present invention and shown in its summer mode configuration.

Referring now to the figures, FIG. 1 illustrates a feeder 20 made in accordance with the principles of the present invention. As shown and as will be described later in further detail, the feeder 20 is designed to provide a convenient and attractive means for feeding butterflies, moths and the like during the summer months and for feeding birds and the like during the winter months. For the purpose of describing the invention, the terms "butterflies" and "moths" are used interchangeably herein.

Figure 2:
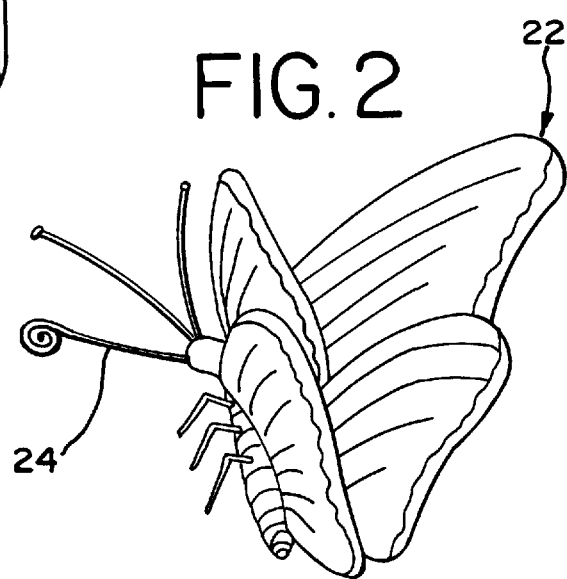
FIG. 2 is an enlarged perspective view of a butterfly showing its partially extended proboscis.

As shown in FIG. 2, an adult butterfly 22 is equipped with characteristic mouth parts, the chief structure of which is a tubular proboscis 24 through which liquids can be sucked up into the mouth. When not feeding, the butterfly 22 carries its proboscis 24 coiled spirally beneath its head. When feeding, the proboscis 24 can be extended and thrust deeply into a flower or other source of food. As is well known, most adult butterflies feed on nectar from flowers, probing the individual cups with their proboscis 24. Certain species also enjoy feeding on over-ripe fruit, while others feed on sweet juices and/or aqueous sugar solutions.

To provide for feeding by butterflies during the summer months, the feeder 20 is constructed to take advantage of the characteristic anatomy of the butterfly 22. The feeder is easily convertible into a first, or summer mode, configuration wherein its food source is accessible to the butterfly, yet inaccessible to other small insects and animals. To this end, the feeder 20 is provided with a feeding grid member 26 including a screen or mesh 28. A grid frame is further provided and includes an upper rim 30 (FIG. 3) attached to and extending around the upper end periphery of the feeding grid 26 and a lower rim 32 attached to and extending around the lower end periphery of the feeding grid 26. The mesh 28 forms the outer surface of the feeder and is a grid or screen having a plurality of small butterfly access openings 34 therethrough and a plurality of larger bird acess openings 36 therethrough. The butterfly access openings 34 of the feeding grid 28 are sized to preclude large animals, such as birds, from ingressing and egressing their mouth parts (e.g., beak) therethrough. Butterfly openings 34 typically are not greater than about 3 millimeters in width, such as between about 1 millimeter and about 3 millimeters, preferably between about 2 and about 3 millimeters, more preferably between about 2.5 and less than about 3 millimeters, most preferably about 2.8 millimeters in width. Whatever size is chosen, the butterfly access openings 34 are of sufficient diameter to allow the butterfly 22 to extend its proboscis 24 therethrough for feeding.

Unlike butterfly access openings 34, the larger bird access openings 36, which are preferably positioned close to the lower rim 32 of grid 26, permit the ingress and egress of the mouth parts of birds or other large animals. Bird access openings 36 are preferably greater than six millimeters in diameter, more preferably at least 6.2 millimeters in width, and even more preferably at least 6.4 millimeters in width. Bird access openings 36 may even be large enough to permit the bird itself to enter and exit feeder 20, but they are most preferably only about 6.4 millimeters in diameter.

Referring back to FIG. 1, feeder 20 is shown in its summer mode configuration and is shown as being suspended. It will be appreciated that feeder 20 is typically hanged from a tree or other support structure (not shown). In particular, a rope or chain 38 extends downward from the support structure and is attached to the eye of a hook 40. The feeder includes a top 42 having a sidewall or rim 43. Top 42 includes a hanging ring 47 mounted thereto, and feeder 20 is hung from the support member when hook 40 extends through hanging ring 47. The top 42 further includes an offset slot 44 which, together with a lug 45 mounted on grid 26, form a bayonet-type lock so that top 42 is removably connected to grid 26. In this regard, top 42 is pressed onto grid 26 so that lug 45 is received within the vertically extending portion of offset slot 44. Top 42 is then turned counterclockwise (as shown in FIG. 1) so that lug 45 is received within the horizontally extending portion of offset slot 44, thereby retaining top 42 in connection with grid 26. To remove top 42 from grid 26, the top is turned clockwise until lug 45 is received within the vertically extending portion of slot 44. Thereafter, top 42 may be easily separated from grid 26. The utility of this removable feature at top 42 is apparent when it is desired to change the food source, change the configuration of the feeder, and/or perform various maintenance tasks.

As shown in FIG. 1, the central portion 48 of the upper surface 50 (FIG. 6) of top 42 is preferably recessed below its periphery 52 to form a well which accommodates a pool 54 of water or the like. As such, a crawling insect guard is defined for the feeder. In that regard, crawling insects and the like are prevented from crawling down rope 38 and eventually into the interior portion of feeder 20 wherein the food source is contained. Thus, crawling insects are denied access to the food source contained within the feeder.

Figure 3:
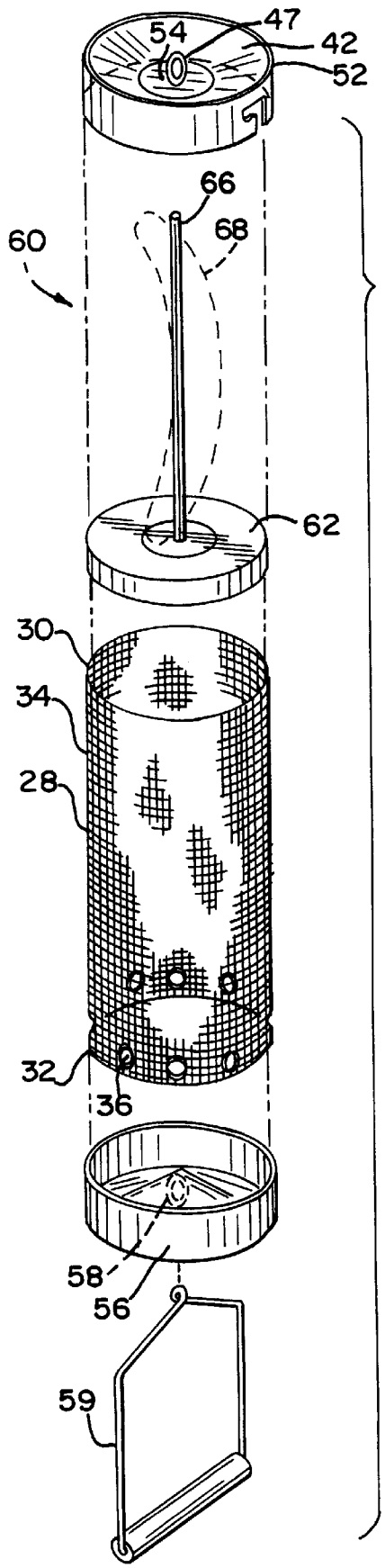
FIG. 3 is an exploded perspective view of the feeder shown in FIG. 1.

The lower rim 32 of grid 26 is snap-fit or otherwise connected to a bottom 56 of the feeder. FIG. 3 shows that bottom 56 preferably has a hanging ring 58 mounted thereto, which may be similar to hanging ring 44. Hanging ring 58 permits a swinging bird perch 59 or the like to be hung therefrom so that feeder 20 may better attract birds, particularly during the winter months. Alternatively, a container with a scent attachment or a decorative ornament may be suspended from hanging ring 58.

Further included as part of feeder 20 is a butterfly (or moth) feeder core piece 60. Butterfly feeder core piece 60 is used with the feeder when it is desired to permit butterfly feeding, yet deny birds and other animals access to the food source contained within the feeder.

Figure 3A:
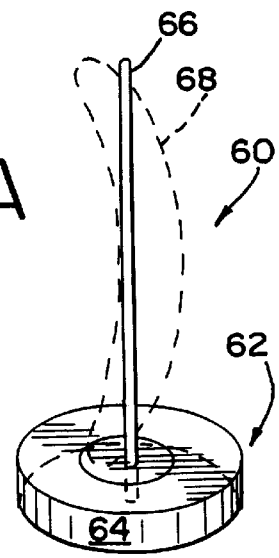
FIG. 3A is a perspective view of a butterfly feeding core piece, which is used with the feeder of FIG. 1 when the feeder is in its summer mode configuration.

Referring to FIG. 3A, butterfly feeder core component or piece 60 is shown to include a base 62 having a peripheral rim or annular sidewall 64 of predetermined height. The butterfly feeder core piece 60 further includes a skewer 66 press-fitted or otherwise connected to base 62 at a central portion thereof, preferably at its center point. A source of food, such as the banana 68 shown in phantom in FIG. 3, is inserted or threaded onto skewer 66 in such a way that, when the butterfly feeder core piece 60 is used with feeder 20, the banana 68 is spaced away from grid 26. It will be appreciated that the source of food can be one or more of a variety of items, such as various other fruit pieces, including slices, cubes, cylinders and portions and pieces of food which will attract the desired feeders. Also included are sponge-like masses which will soak up and hold food having needed properties, such as sweetness, this type of food including sugar water.

Preferably, the source of food will be about thirty-eight millimeters in diameter, and the spacing between the peripheral edge of the food and grid 26 will be between nineteen millimeters and thirty-eight millimeters, more preferably between about twenty-five millimeters and about thirty-four millimeters, most preferably about thirty-two millimeters.

Base 62 of butterfly feeder assembly 60 preferably has a generally cylindrical shape having a radius close to, but less than the radius of mesh 28. As such, peripheral rim 64, when used with feeder 20, is positioned close to the inside surface of mesh 28 at the lower end thereof and covers or closes bird access openings 36. The butterfly access openings being too small for their mouth parts, birds and the like are denied access to the source of food contained within feeder 20 when the butterfly feeder core piece 60 is inserted within the feeder (i.e., when the feeder is in its summer mode configuration).

Figure 4:
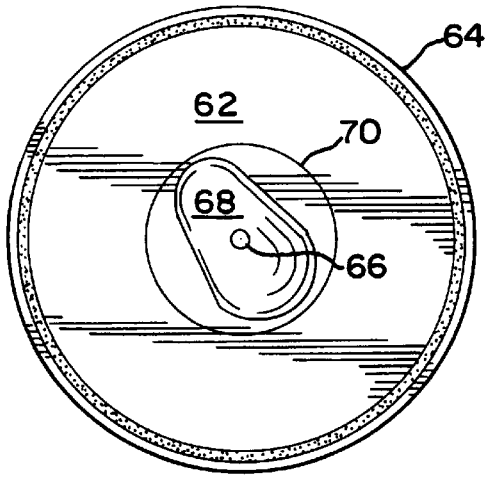
FIG. 4 is a top view of the butterfly feeding core piece, as used with the feeder of FIG. 1.

Referring to FIG. 4, the upper surface of base 62 is shown to include a line of demarcation 70 which defines the preferred spacing between the source of food and the grid 26. As stated above, the preferred spacing between the grid and the food source is between about nineteen millimeters and thirty-eight millimeters, more preferably between about twenty-five millimeters and about thirty-four millimeters, most preferably about thirty-two millimeters. With this spacing and with use of the crawling insect guard, animals and insects which would otherwise be able to feed through the butterfly access openings (for example houseflies), other than butterflies and moths, are denied access to the food source contained within the feeder.

Referring to FIG. 6, the upper surface 50 of top 42 is also shown to include another line of demarcation 72, which, in this case, signifies the preferred periphery of the pool 54 of water for the crawling insect guard. This line of demarcation 72 defines a crawling insect guard which is of sufficient diameter to prevent crawling insects from access to the food source contained within feeder 20, yet is of small enough diameter, based on the incline between the central portion 48 of top 42 and its periphery 52, to prevent spillage of the pool 54 of water should the feeder 20 swing due to large gusts of wind and the like.

FIG. 5 shows feeder 20 in its winter mode configuration wherein the butterfly feeding core piece 60 has been removed from the interior of the feeder. As such, bird access openings 36 are no longer covered by the annular rim 64 of the base of butterfly feeding core piece 60. In its preferred arrangement, a perch 74 or multiple perches may be inserted into two bird access openings 36 on diametrically opposed sides of grid 26. Alternatively, structures specifically designed to support perch-type components can be used. The interior of feeder 20 is preferably filled with bird seed 76 or the like, and a bird 78 may stand on perch 74 and consume the bird seed 76 from an adjacent or other nearby bird access opening 36 of the feeder. Here, as in FIG. 1, swinging bird perch 59 may be hung from hanging ring 58 mounted on bottom 56 of the feeder.

Figure 7:
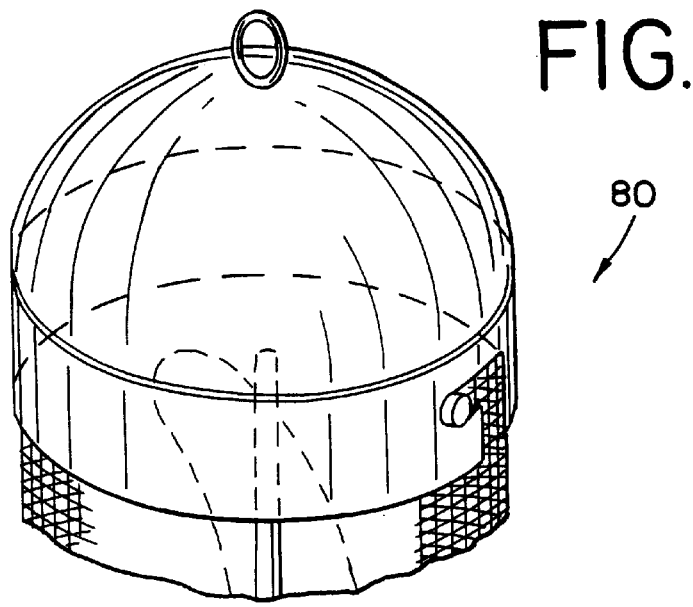
FIG. 7 is a cut away perspective view of a different top which may be used with the feeder of FIG. 1.
Figure 8:
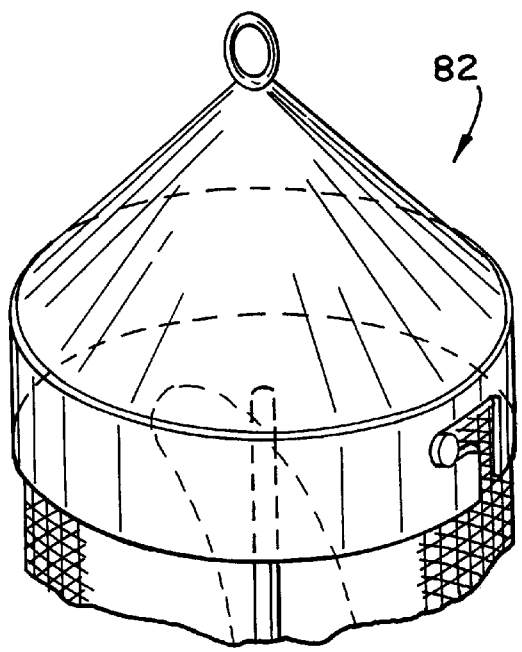
FIG. 8 is a cut away perspective view of another top which may be used with the feeder of FIG. 1.
Figure 9:
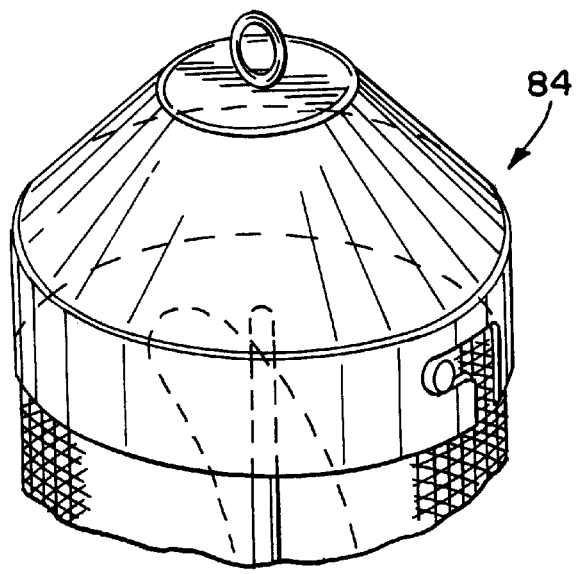
FIG. 9 is a cut away perspective view of yet another top which may be used with the feeder of FIG. 1.

FIGS. 7–9 illustrate alternative tops for feeder 20. In FIG. 7, a rounded top 80 is shown. FIG. 8 shows a cone shaped top 82. And FIG. 9 shows a truncated cone shaped top 84.

Although the preferred embodiments of the present invention have been described and discussed above, it will be understood that certain modifications or changes can be made to those embodiments by those skilled in the art without departing from the true scope and spirit of the invention, as defined by the following claims.

I claim:

1. A convertible feeder comprising:

a top;

a grid connected to said top, said grid defining a plurality of openings including a first set of openings and a second set of openings, said first set of openings sized large enough to permit the ingress and egress of a butterfly or moth proboscis yet small enough to prevent the ingress and egress of mouth parts of a bird, said second set of openings sized large enough to permit the ingress and egress of the mouth parts of a bird;

a removable and insertable butterfly feeder core component positionable within said grid and having a base with a peripheral rim that substantially covers said second set of openings, while leaving uncovered at least some of said first set of openings, when said core component is positioned within said grid; and a bottom connected to said grid.

2. The feeder of claim 1 further comprising a hanging member mounted to said top.

3. The feeder of claim 2 wherein said hanging member comprises a hanging ring.

4. The feeder of claim 1 wherein said top has an upper surface which is ramped so that it extends upward as it extends radially outward from its central portion to form a well which defines a crawling insect guard for said feeder when a pool of liquid is within said well.

5. The feeder of claim 1 wherein said grid has first and second ends, said top being connected to said grid at said first end, said bottom being connected to said grid at said second end, and said second set of openings being positioned closer to said second end of said grid than said first end of said grid.

6. The feeder of claim 1 wherein said butterfly feeder core component further comprises a skewer connected to and extending away from said base.

7. The feeder of claim 6 wherein said base includes a line of demarcation signifying the preferred spacing between a food source and said grid when said food source is on said skewer and said core component is positioned within said grid.

8. The feeder of claim 1 further comprising a hanging member mounted to said bottom.

9. The feeder of claim 8 wherein said hanging member comprises a hanging ring.

10. The feeder of claim 1 wherein the openings of said first set are less than about three millimeters in width.

11. The feeder of claim 1 wherein the openings of said second set are greater than about six millimeters in width.

12. The feeder of claim 11 wherein the openings of said first set are less than about three millimeters in width.

13. A feeder comprising:

a top;

a grid connected to said top, said grid generally defining an interior space of the feeder, said grid having a plurality of openings including a first set of openings and a second set of openings, said first set of openings being comprised of openings which are between about three millimeters and about one millimeter in width, said second set of openings being comprised of openings which are at least about six millimeters in width;

a removable and insertable butterfly feeder core component positionable within said grid and having a base with an annular rim that substantially covers said second set of openings, while leaving uncovered at least part of said first set of openings, when said butterfly feeder core component is positioned within said grid; and a bottom connected to said grid.

14. The feeder of claim 13 further comprising a hanging member mounted to said top.

15. The feeder of claim 13 wherein said top has an upper surface which is ramped so that it extends upward as it extends radially outward from its central portion to form a well defining a crawling insect guard for said feeder when a pool of liquid is poured into said well.

16. The feeder of claim 13 wherein said grid has first and second ends, said top being connected to said grid at said first end, said bottom being connected to said grid at said second end, and said second set of openings being positioned closer to said second end of said grid than said first end of said grid.

17. The feeder of claim 13 wherein said butterfly feeder core component further comprises a skewer connected to and extending away from said base.

18. The feeder of claim 17 wherein said base includes a line of demarcation signifying the preferred spacing between a food source and said grid when said food source is threaded onto said skewer and said core component is positioned within said grid.

19. The feeder of claim 13 further comprising a hanging member mounted to said bottom.

20. The feeder of claim 13 wherein said top includes a movable top panel for permitting access to the interior space.

21. A convertible feeder for feeding butterflies and birds, comprising:

a top having an upper surface which is ramped so that said upper surface extends upward as it extends radially outward from a central portion of said upper surface to form a well defining a crawling insect guard for said feeder when a pool of liquid is within said well, said top having a hanging member mounted thereto;

a grid having first and second ends, said grid being connected to said top at said first end of said grid, said grid having a plurality of openings including a first set of openings and a second set of openings, said first set of openings being comprised of openings which are less than about three millimeters in width, said second set of openings being comprised of openings which are greater than about six millimeters in width;

a removable and insertable butterfly feeder core component positionable within said grid, said core component having a base and a skewer, said butterfly feeder core base having an annular rim that substantially covers said second set of openings when said butterfly feeder core component is positioned within said grid, said butter feeder core base including a line of demarcation signifying the preferred spacing between a food source and said grid when said food source is supported by said skewer and said core component is positioned within said grid; and a bottom connected to said grid at said second end of said grid, said feeder having a bottom hanging member mounted thereto.

* * * * *